United States Patent Office 3,558,627
Patented Jan. 26, 1971

3,558,627
6 - AMINO - URACIL - 5 - CARBONAMIDO - N-SULFONAMIDES AND PROCESS FOR THEIR PREPARATION
Otto Scherer, Bad Soden, Taunus, and Friedhelm Kluge, Frankfurt am Main, Germany, assignors to Farbwerke Hoechst Aktiengesellschaft vormals Meister Lucius & Bruning, Frankfurt am Main, Germany, a corporation of Germany
No Drawing. Filed Sept. 29, 1967, Ser. No. 671,585
Claims priority, application Germany, Oct. 5, 1966,
F 50,358
Int. Cl. C07d 51/30
U.S. Cl. 260—256.5                    11 Claims

ABSTRACT OF THE DISCLOSURE 6-amino-uracil-5-carbonamido-N-sulfonamides having diuretic activity and process for their preparation.

---

The present invention relates to 6-amino-uracil-5-carbonamido-N-sulfonamides of the general Formula I

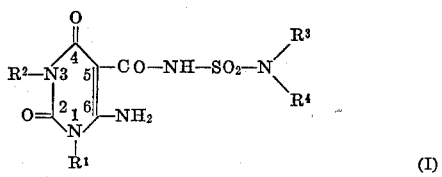

wherein $R^1$ and $R^2$ are the same or different and represent saturated or unsaturated aliphatic hydrocarbon radicals with 1 to 4 carbon atoms, cycloaliphatic, aromatic or alkyl radicals substituted by heterocyclic or aromatic groups and $R^3$ and $R^4$ represent hydrogen or alkyl groups with 1 to 4 carbon atoms and to a process for their preparation in which a 6-amino-uracil of the general Formula II

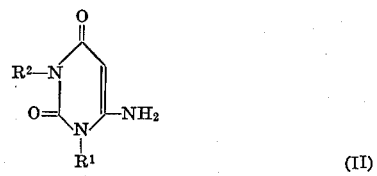

wherein $R^1$ and $R^2$ have the meaning given above, is reacted with N-carbonylsulfamic acid chloride of the formula

$$O=C=N-SO_2Cl$$

and the 6-amino-uracil-5-carbonamido-N-sulfochloride thus obtained of Formula III

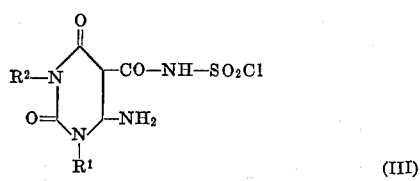

is reacted with ammonia or an amine of the general Formula IV

Since it is known that amino groups react especially easily with carbonylsulfamic acid chloride, it had to be expected that a N-uracil-N'-sulfochloride-urea would be formed in this reaction. The exclusive entry of the carbonamido-N-sulfochloride radical into the 5-position of the uracil-ring is extraordinarily surprising. As starting substances enter into consideration, for example:

1-cyclohexyl-3-methyl-6-amino-uracil,
1 benzyl-3-methyl-6-amino-uracil,
1-p-chlorophenyl-3-methyl-6-amino-uracil,
1-phenyl-3-methyl-6-amino-uracil,
1-methallyl-3-methyl-6-amino-uracil,
1-n-butyl-3-methyl-6-amino-uracil,
1,3-di-n-butyl-6-amino-uracil,
1,3-di-n-propyl-6-amino-uracil,
1,3-diethyl-6-amino-uracil,
1,3-diallyl-6-amino-uracil,
1-i-butyl-3-methyl-6-amino-uracil,
1-n-propyl-3-methyl-6-amino-uracil,
1-n-propyl-3-methyl-6-amino-uracil,
1-p-tolyl-3-methyl-6-amino-uracil.

They can be obtained according to known methods as described for instance in J. Org. Chem. 16, pp. 1879–1890.

The reaction of the amino-uracil with N-carbonyl-sulfamic acid chloride is carried out preferably at temperatures between −40° and 30° C. and in a polar solvent indifferent with respect to the participants in the reaction. Particularly useful are liquid sulfur dioxide or a surplus N-carbonyl-sulfamic acid chloride itself. In the first case for example 1 mol of the amino-uracil used is dissolved in liquid sulfur dioxide at temperatures below −10° C. and at least 1 mol of N-carbonyl-sulfamic acid chloride is added to the solution. The temperature is allowed to increase to the boiling temperature of sulfur dioxide, or when using a pressure recipient, no more than +30° C. The reaction heat is led off, for example through a cooler. The reaction is terminated within a few minutes, the reaction product precipitating in most cases. It is isolated for example by filtration at a temperature below −10° C. or under pressure at a temperature above −10° C. Preferably the sulfur dioxide is evaporated at −10 to −5° C. during which process it is suitable to add an indifferent suspending agent, for instance a hydrocarbon in order to avoid adhering of the reaction product at the sides of the vessel. From the suspension thus obtained the reaction product can easily be obtained by filtration. If an excess of N-carbonylsulfamic acid chloride is used, which can be done without disadvantage to the reaction provided a temperature below +30° C. is maintained, the use of an inert suspension agent is of particular advantage when isolating the reaction product since, on filtration, it carries the excess of N-carbonyl-sulfamic acid chloride into the filtrate, from which it may be recovered by distillation. Aliphatic or cycloaliphatic hydrocarbons are especially suitable as suspension agents owing to the insolubility of the reaction products in these solvents. For the reaction N-carbonylsulfamic acid chloride itself may also be used as solvent by introducing the amino-uracil for example into 3 to 10 times the amount of N-carbonyl-sulfamic acid chloride, suitably under stirring at a temperature below that at which reaction starts, preferably between −30 and 0° C. heating the mixture until the exothermic reaction starts and keeping the temperature below +30° C. By adding an inert solvent, for instance an aliphatic or cycloaliphatic hydrocarbon, the reaction product is obtained in the form of an easily filtrable suspension. From the filtrate the non-reacted N-carbonylsulfamic acid chloride can be recovered by fractioned distillation.

The reaction of N-carbonylsulfamic acid chloride with the 6-amino-uracil may also be carried out in an indifferent suspension agent for example in a hydrocarbon.

The reaction products, for example the 6-amino-uracil-5-carbonamido-N-sulfochlorides can be purified by recrystallization for example from a hydrocarbon such as benzene, but they may also be reacted without further purification with ammonia or a primary or secondary amine to the 6-amino-uracil-carbonamido-N-sulfoamide. As such amines there can be used for example: methylamine, dimethylamine, ethylamine, propyl- or isopropylamine, dipropyl- or di-isopropylamine, butyl- and dibutylamines and the isomeric butyl- and dibutylamines.

The sulfochlorides are introduced into an aqueous solution of ammonia or of the amine, the amount of which is sufficient for binding the hydrogen chloride which is released during the reaction and the reaction product is isolated by acidifying the reaction solution. This reaction may also be carried out in a non-aqueous indifferent solvent, for example in benzene. In this case the reaction product is at first isolated by filtration together with the ammonium chloride or respectively with the alkyl- or dialkyl-ammonium chloride formed and from the mixture obtained, the latter is extracted with water. The reaction products can be purified by recrystallization for example from an alcohol if necessary.

The products of the invention have valuable therapeutic properties and can be used as medicaments. They are distinguished for example by excellent diuretic and carboanhydrase-inhibiting properties. They, if desired or required in admixture with pharmaceutically acceptable carriers, can be administered orally or parenterally in the form of tablets, capsules and dragées. Suitable carriers are for example starch, lactose, tragacanth or magnesium stearate. The following examples serve to illustrate the invention but they are not intended to limit it thereto. The temperatures indicated are given in ° C.

EXAMPLE 1

1-n-propyl-3-ethyl-6-amino-uracil-5-carbonamido-N-sulfonamide 36 grams of 1-n-propyl-3-ethyl-6-amino-uracil are dissolved in approximately 250 cc. of sulfur dioxide at —40° in a stirring flask provided with a reflux condenser which is maintained at —80°. After adding 32 grams of N-carbonylsulfamic acid chloride the cooling bath is removed. The temperature rises, —20° approximately the reaction starts by precipitating solid substances. During the reaction the temperature rises rapidly to —10°. Within a few minutes the reaction is terminated. The sulfur dioxide is evaporated under simultaneous dropwise addition of 250 cc. of cyclohexane. During this process the batch is slowly heated to 20° in order to accelerate the evaporation of sulfur dioxide. The reaction product suspended in the cyclohexane is filtered off with suction and dissolved in 600 cc. of boiling benzene. After seaparating by filtration a small amount of an insoluble substance the solution is saturated with ammonia at 30–55°. The percipitate which forms is filtered off with suction, dried in vacuo and stirred with 300 cc. of water, whereby the ammonium chloride is dissolved. The product is filtered off with suction and dried. The yield is 44 grams=76% of the theoretical amount.

After recrystallization from ethanol the melting point is 184–187° (dec.).

*Analysis.*—Calcd. percent: C, 37.7; H, 5.35; N, 21.9; S, 10.05. Found (percent): C, 37.3; H, 5.7; N, 22.1; S, 10.3.

EXAMPLE 2

1-n-propyl-3-ethyl-6-amino-uracil-5-carbonamido-N-sulfondiethylamide 15 grams of the sulfochloride obtained from 1-n-propyl-3-ethyl-6-amino-uracil and N-carbonylsulfamic acid chloride as described in Example 1 are dissolved in 150 cc. of hot benzene. The solution is clarified by filtration and 14 cc. of diethylamine are added. The product is left for 2 hours at room temperature, the diethylammonia chloride is filtered off with suction, the filtrate is concentrated by evaporation in vacuo and the resinous crude product is recrystallized from methanol. There are obtained 10 grams, melting point 132–136°.

*Analysis.*—Calcd. (percent): S, 8.55; N, 18.7. Found (percent): S, 8.6; N, 18.7.

EXAMPLE 3

1-n-propyl-3-ethyl-6-amino-uracil-5-carbonamido-N-sulfon-n-butylamide

In a manuner analogous to that described in Example 2 there are obtained with n-butylamide 11 grams of the above compound. Melting point 163–165°.

*Analysis.*—Calcd. (percent): S, 8.55; N, 18.7. Found (percent): S, 8.3; N, 18.2.

EXAMPLE 4

1,3-dimethyl-6-amino-uracil-5-carbonamido-N-sulfonamide 25 grams of 1,3-dimethyl-6-amino-uracil are introduced into 120 grams of N-carbonylsulfamic acid chloride cooled to —30° under stirring. The cooling bath is then removed and the temperature allowed to slowly rise. At +5° the exothermic reaction starts. By dipping the reaction recipient into a cooling bath of —70° the rising temperature is stopped at +20°. The batch is kept at this temperature during 10 minutes and the pasty reaction mixture is diluted with 250 cc. of benzene. After filtration with suction and washing with methylene chloride there are obtained 40 grams of 1,3-dimethyl-6-amino-uracil-5-carbonamido-N-sulfochloride. After recrystallization from toluene-cyclohexane the melting point is 157–160° (dec.).

*Analysis.*—Calcd. (percent): N, 18.9; S, 10.8; Cl, 12.0. Found (percent): N, 18.8; S, 10.7; Cl, 11.3.

To 31 grams of this compound 100 grams of ice and about 150 cc. of aqueous ammonia of 25% strength are added. After 10 minutes the reaction solution is acidified by adding hydrochloric acid. The reaction product which has precipitated is filtered off with suction and recrystallized from methanol. Yield: 20 grams melting point 187–188° (dec.).

*Analysis.*—Calcd. (percent): C, 30.4; H, 4.0; N, 25.3; S, 11.6. Found (percent): C, 30.2; H, 4.3; N, 24.6; S, 11.6.

EXAMPLE 5

1-allyl-3-ethyl-6-amino-uracil-5-carbonamido-N-sulfonamide 40 grams of 1-allyl-3-ethyl-6-amino-uracil are introduced into 150 grams of N-carbonylsulfamic acid chloride cooled to —30°. The reaction which starts at —20° is stopped by cooling at +10°. After 10 minutes the batch is diluted with 200 cc. of benzene and filtered with suction. After recrystallization from toluene-cyclohexane the yield is 29 grams.

100 cc. of aqueous ammonia of 25% strength are poured over the reaction product, the hot solution obtained is clarified by filtration and acidified with hydrochloric acid. 24 grams of 1-allyl-3-ethyl-6-amino-uracil-5-carbonamido-N-sulfonamide precipitate. After recrystallization from ethanol of 50% strength the melting point is 179°.

*Analysis.*—Calcd. (percent): N, 22.1; S, 10.1. Found (percent): N, 22.0; S, 10.3.

EXAMPLE 6

1-furfuryl-3-methyl-6-amino-uracil-5-carbonamido-N-sulfonamide 16 grams of 1-furfuryl-3-methyl-6-amino-uracil are suspended in 150 cc. of liquid sulphur dioxide. At —10°, 7 cc. of N-carbonylsulfamic acid chloride are added dropwise within half an hour. During this process the starting material is dissolved and a finely pulverized substance precipitates. After evaporation of the sulphur dioxide 50 grams of ice and 30 cc. of aqueous ammonia of 25% strength are added to the solid residue. After some minutes the whole is dissolved, on acidification 22 grams of the crude reaction product are obtained. After recrystallization from ethanol of 50% strength the melting point is 188°.

*Analysis.*—Calcd. (percent): C, 38.5; H, 3.8; N, 20.4; S, 9.3. Found (percent): C, 38.7; H, 4.0; N, 19.9; S, 9.3.

EXAMPLE 7

1-phenyl-3-allyl-6-amino-uracil-5-carbonamido-N-sulfonamide 30 grams of 1-phenyl-3-allyl-6-amino-uracil are dissolved at −30° in 200 cc. of liquid sulphur dioxide. After addition of 14 cc. of N-carbonylsulfamic acid chloride the sulphur dioxide is evaporated. The solid residue is recrystallized from benzene. 56 grams (containing approximately 25% of crystal benzene) are obtained. 40 cc. of aqueous ammonia of 25% strength are poured over 9 grams of this compound. The solution obtained is acidified, the product which precipitates is filtered with suction. After boiling with benzene, 5.5 grams of 1-phenyl-3-allyl-6-amino-uracil - 5 - carbonamido - N - sulfonamide remain, melting point 185–187°.

*Analysis.*—Calcd. (percent): N, 19.2. Found (percent): 19.2.

EXAMPLE 8

1,3-di-isobutyl-6-amino-uracil-5-carbonamido-N-sulfonamide

To a suspension of 25 grams of 1,3-di-isobutyl-6-amino-uracil in 150 cc. of xylene 12 cc. of N-carbonylsulfonamic acid chloride are added at 20° C. After half an hour the fatty substance formed is filtered with suction and the adhering xylene is eliminated by washing with pentane.

The product (30 grams) is triturated with 100 grams of ice and ammonia of 25% strength to a homogeneous paste, and the reaction mixture is acidified with acetic acid. After filtration and recrystallization from methanol 15 grams of 1,3-di-isobutyl-6-amino-uracil-5-carbonamido-N-sulfonamide are obtained. Melting point 193–195° (decomposition).

*Analysis.*—Calcd. (percent): C, 43.1; H, 6.1; N, 19.5; S, 8.9. Found (percent): C, 43.2; H, 6.5; N, 20.2; S, 9.0.

We claim:
1. A 6-amino-uracil-5-carbonamido-N-sulfonamide of the formula

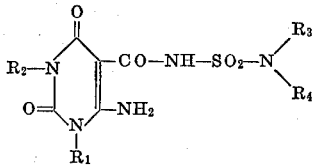

wherein $R_1$ and $R_2$ are the same or different and are each alkyl or alkenyl having up to 4 carbon atoms, or one of $R_1$ or $R_2$ is cyclohexyl, furfuryl, benzyl, phenyl chlorophenyl, or methyl-phenyl, and $R_3$ and $R_4$ are hydrogen or alkyl having 1 to 4 carbon atoms.

2. A compound as claimed in claim 1 wherein $R_1$ and $R_2$ means alkyl or alkenyl having up to 4 carbon atoms and $R_3$ and $R_4$ means hydrogen.

3. A compound as claimed in claim 1 wherein $R_1$ means propyl, $R_2$ means ethyl and $R_3$ and $R_4$ means hydrogen.

4. A compound as claimed in claim 1 wherein $R_1$ means propyl and $R_2$, $R_3$ and $R_4$ means ethyl.

5. A compound as claimed in claim 1 wherein $R_1$ means propyl, $R_2$ means ethyl, $R_3$ means n-butyl and $R_4$ means hydrogen.

6. A compound as claimed in claim 1 wherein $R_1$ and $R_2$ means methyl and $R_3$ and $R_4$ means hydrogen.

7. A compound as claimed in claim 1 wherein $R_1$ means allyl, $R_2$ means ethyl and $R_3$ and $R_4$ mean hydrogen.

8. A compound as claimed in claim 1 wherein $R_1$ means furfuryl, $R_2$ means methyl and $R_3$ and $R_4$ mean hydrogen.

9. A compound as claimed in claim 1 wherein $R_1$ means phenyl, $R_2$ means allyl and $R_3$ and $R_4$ mean hydrogen.

10. A compound as claimed in claim 1 wherein $R_1$ and $R_2$ means isobutyl and $R_3$ and $R_4$ means hydrogen.

11. A method for making 6-amino-uracil-5-carbonamido-N-sulfonamides of the formula

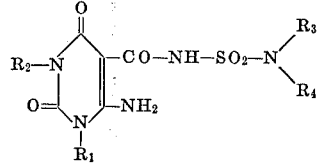

wherein $R_1$ and $R_2$ are the same or different and are each alkyl or alkenyl having up to 4 carbon atoms, or one of $R_1$ or $R_2$ is cyclohexyl, furfuryl, benzyl, phenyl, chlorophenyl, or methyl-phenyl, and $R_3$ and $R_4$ are hydrogen or alkyl having up to 4 carbon atoms, in which method a 6-amino-uracil of the formula

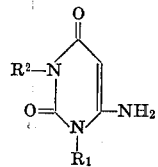

is reacted in an inert polar solvent at a temperature from −40° C. to 30° C. with N-carbonylsulfamic acid chloride of the formula

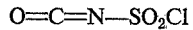

$$O=C=N-SO_2Cl$$

and the 6-amino-uracil-5-carbonamido-N-sulfochloride of the formula

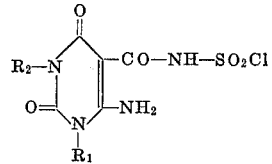

obtained is contacted with ammonia or an amine of the formula

References Cited

UNITED STATES PATENTS

| | | | |
|---|---|---|---|
| 2,931,813 | 4/1960 | Kalm | 260—256.5 |
| 3,080,370 | 3/1963 | Schroeder | 260—256.5 |
| 3,105,077 | 9/1963 | Muller et al. | 260—256.5 |

ALEX MAZEL, Primary Examiner

R. J. GALLAGHER, Assistant Examiner

U.S. Cl. X.R.

260—256.4, 999